United States Patent

Choi

[11] Patent Number: 5,833,531
[45] Date of Patent: Nov. 10, 1998

[54] APPARATUS FOR CONTROLLING FLOW OF DISCHARGED AIR IN AIR CONDITIONER, AND METHOD THEREFOR

[75] Inventor: Kwang-Soo Choi, Suwon, Rep. of Korea

[73] Assignee: Samsung Electronics Co., Ltd., Suwon, Rep. of Korea

[21] Appl. No.: 933,043

[22] Filed: Sep. 18, 1997

[30] Foreign Application Priority Data

Nov. 1, 1996 [KR] Rep. of Korea ................... 1996-51547

[51] Int. Cl.⁶ ....................................................... F24F 13/15
[52] U.S. Cl. ............................................. 454/285; 454/256
[58] Field of Search ................................... 454/125, 153, 454/256, 285

[56] References Cited

U.S. PATENT DOCUMENTS

| 4,365,542 | 12/1982 | Watanabe et al. | 454/285 |
| 4,425,840 | 1/1984 | Masao | 454/285 X |
| 4,878,620 | 11/1989 | Tarleton | 454/285 X |

FOREIGN PATENT DOCUMENTS 33 33 253  3/1985  Germany ................................. 454/153

*Primary Examiner*—Harold Joyce
*Attorney, Agent, or Firm*—Burns, Doane, Swecker & Mathis, L.L.P.

[57] ABSTRACT

An apparatus for controlling the discharge flow in an air conditioner, and a method therefor. The discharged air flow rate is adjusted in many ways, and at the same time, the air flow rate is increased or decreased in accordance with the air discharge direction so as to form a helical wind, thereby maintaining the room temperature at a constant level. An operation manipulating means inputs key signals to make the discharged air form a helical flow. A control means controls the blow direction of the blow direction vanes and the flow rate of the indoor fan to make the discharged air form a helical blow in accordance with the key signals. A blow direction adjusting means adjusts the blow direction of the discharged air by shifting the blow direction angle of the blow direction vanes under the control of the control means. A flow rate adjusting means adjusts the flow rate of the discharged air by varying the flow rate of the indoor fan under the control of the control means.

6 Claims, 11 Drawing Sheets

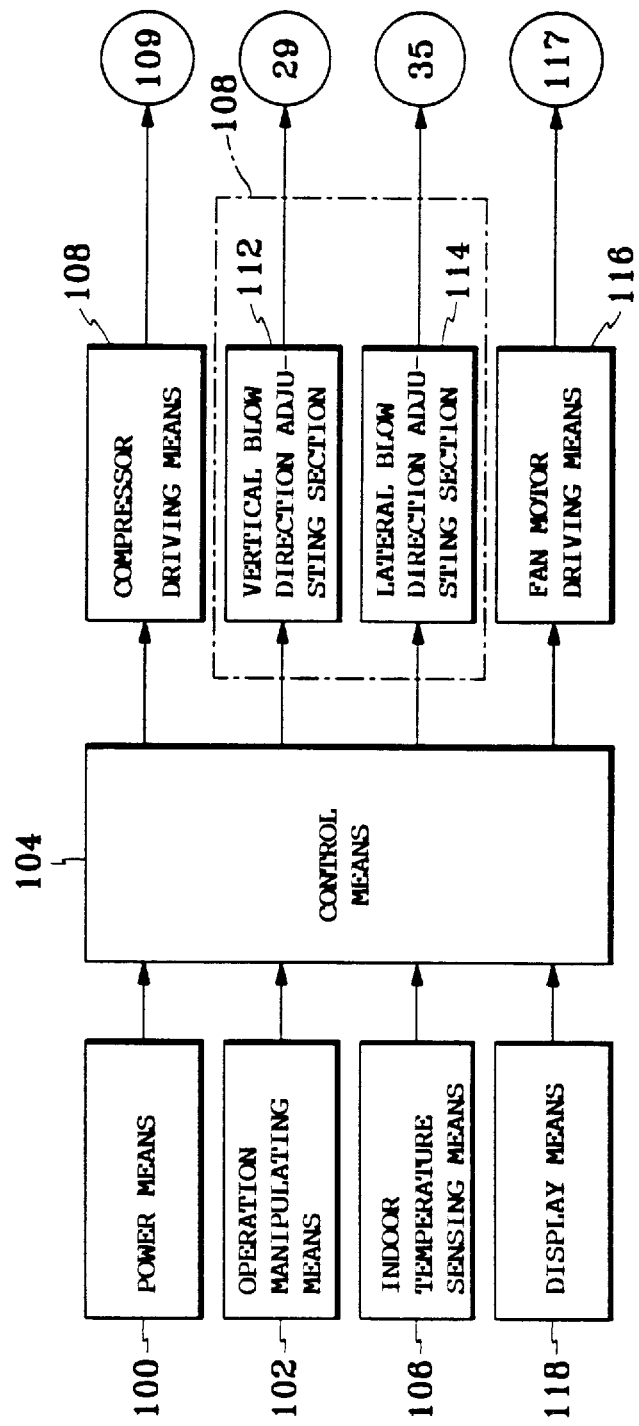

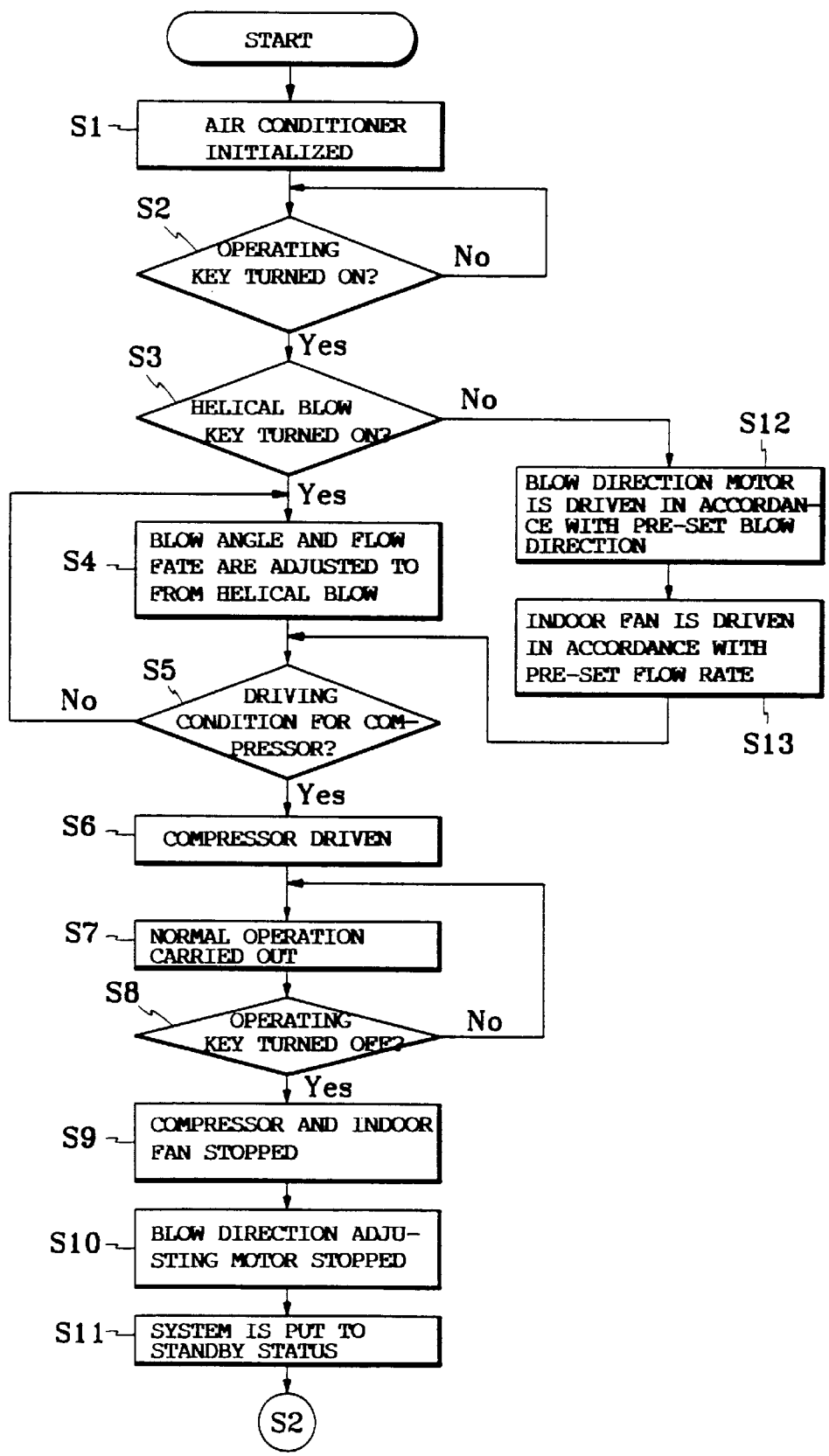

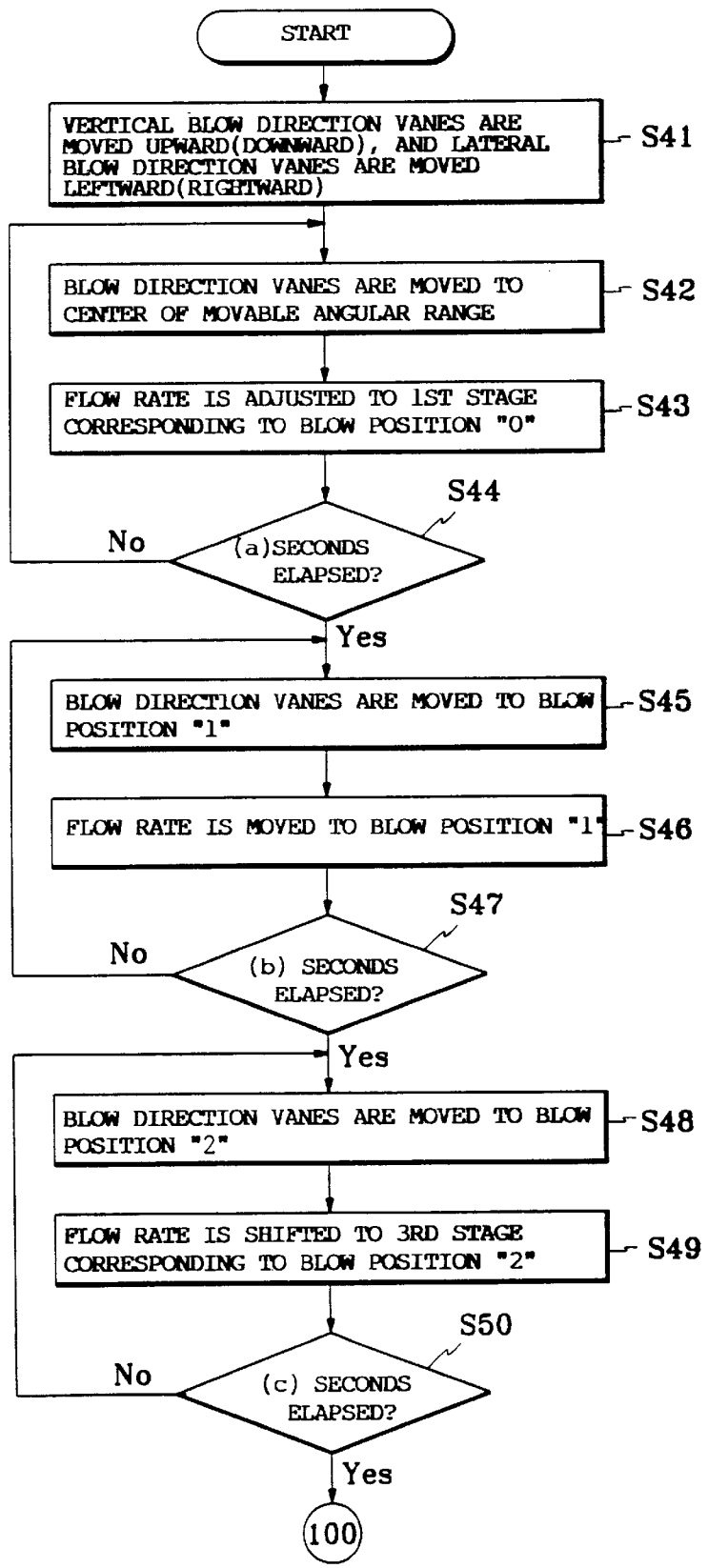

FIG. 7

| LATERAL/VERTICAL COMBINED BLOW POSITION | 0 | 1 | 2 | 3 | 4 | ... | 38 | 39 | 40 | 41 | 42 |
|---|---|---|---|---|---|---|---|---|---|---|---|
| ANGLE OF LATERAL BLOW DIRECTION VANES | ∅ | a | c | b | ∅ | ... | o' | m' | ∅ | o | q |
| ANGLE OF VERTICAL BLOW DIRECTION VANES | ∅ | A | ∅ | A' | C' | ... | ∅ | L | Q | 0 | ∅ |
| FLOW RATE | 1 | 2 | 3 | 4 | 5 | ... | 39 | 40 | 41 | 42 | 43 |

APPARATUS FOR CONTROLLING FLOW OF DISCHARGED AIR IN AIR CONDITIONER, AND METHOD THEREFOR

BACKGROUND OF THE INVENTION

1. Field of the Invention

The present invention relates to an apparatus for controlling the flow of discharge air in an air conditioner, and a method therefor, in which the discharged air flow rate is adjusted in many ways, and at the same time, the air flow rate is increased or decreased in accordance with the air discharge direction so as to form a helical wind, thereby maintaining the room temperature at a constant level.

2. Description of the Prior Art

As shown in FIG. 1, the conventional air conditioner is constituted as follows. That is, on a front lower portion of an indoor main body 1 (to be called main body below), there is installed a suction grille member 5 in which a plurality of suction holes 3 are formed to suck the indoor air. On the front upper portion of the main body 1, there is formed a discharge hole 7, and this discharge hole 7 discharges into the room the air which has been heat-exchanged to a cool or hot air after being sucked through the suction hole 3.

On the entire front face of the main body 1, there is fixedly attached a cover member 9 which protects the internal components and makes the external appearance of the air conditioner aesthetically desirable. On the upper portion of the cover member 9, there is formed a manipulating part 11 which is capable of controlling the operating modes (automatic, cooling, de-humidifying, blowing, heating and the like), start and stop of the operation, the blow direction and the blow rate of the discharged air.

Within the suction grille member 5, there is installed a filtering member 13 which filters foreign materials such as dust and the like from the sucked air. Within the filtering member 13, there is installed an oblong heat exchanger 15 which converts the filtered air to a cool or hot air by utilizing the potential evaporation heat of the refrigerant. Beneath the heat exchanger 15, there is installed a draining dish 17 which drains the water which is condensated during the heat exchange.

On the top of the heat exchanger 15, there is installed a blower fan 19 (to be called "indoor fan" below) which sucks the indoor air through the suction hole 3, and at the same time, is made to revolve by an indoor fan motor (not shown) so as to discharge the heat-exchanged air through the discharge hole 7 into the room. On the outside of the indoor fan 19, there is formed a duct member 21 for covering the indoor fan 19 and for guiding the flow of the air which is discharged through the discharge hole 7 after being sucked through the suction hole 3.

The discharge hole 7 is provided with vertical blow direction vanes 23 for adjusting the vertical blow direction of the discharged air (discharged into the room), and lateral blow direction vanes for adjusting the blow direction of the discharged air to the left and right.

As shown in FIG. 2, the vertical blow direction vanes 23 are rotatably installed on a holder member 27, and at a side of the holder member 27, there is installed a vertical blow direction motor 29. At another side of the holder member 27, there is installed a link member 31 which is interlocked to the vertical blow direction motor 29 for rotating the vertical blow direction vanes 23. In the link member 31, there are inserted a plurality of supporting portions 23a of the vertical blow direction vanes 23, and for this purpose, a plurality of ring shaped securing parts 31a are formed on the link member 31.

As shown in FIG. 3, the lateral blow direction vanes 25 are rotatably installed on a holder member 33, and at a side of the holder member 33, there is installed a vertical blow direction motor 35 by means of a motor fixing part 33a. At another side of the holder member 33, there is installed a link member 37 which is interlocked to the lateral blow direction motor 35 for rotating the lateral blow direction vanes 25. In the link member 37, there are inserted a plurality of supporting portions 25a of the lateral blow direction vanes 25, and for this purpose, a plurality of ring shaped securing parts 37a are formed on the link member 37.

In the air conditioner constituted as described above, if the user selects and presses an operating key by using a remote controller or a manipulation part 11, then an indoor motor (not shown in the drawings) is driven, and the indoor fan 19 is rotated, with the result that the indoor air is sucked through the suction hole 3 into the main body 1.

Then the foreign materials such as dust and the like floating within the air are removed by the filtering member 13. The sucked indoor air which is deprived of the foreign materials by the filtering member 13 flows through the heat exchanger 15, so that the air would be heat-exchanged by the potential heat of the refrigerant of the heat exchanger 15.

The air which has been heat-exchanged by the heat exchanger 15 is guided upward by the duct member 21 to be discharged through the discharge hole 7 into the room. The air which is discharged through the discharge hole 7 is adjusted up and down and to the left and right.

As to the method for adjusting the blow direction vertically, if a key for actuating the vertical blow direction vanes 23 is pressed through the manipulation part 11, then the vertical blow direction motor 29 is driven, and the link member 31 is interlockingly actuated, so that the vertical blow direction vanes 23 would be moved vertically. If the key is turned off, the vertical blow direction motor 29 is deactivated, and the vertical blow direction vanes 23 are stopped, thereby making it possible to adjust the direction vertically.

As to the method for adjusting the blow direction laterally, if a key for actuating the lateral blow direction vanes 25 is pressed through the manipulation part 11, then the lateral blow direction motor 35 is driven, and the link member 37 is interlockingly actuated, so that the lateral blow direction vanes 25 would be moved laterally. If the key is turned off, the lateral blow direction motor 35 is deactivated, and the lateral blow direction vanes 25 are stopped, thereby making it possible to adjust the direction laterally.

In the conventional air conditioner constituted as described above, however, the user has to directly confirm the positions of the vertical and lateral blow direction vanes 23 and 25 when manipulating the key, and thus the desired blow direction has to be detected. Therefore, the manipulation is very troublesome, and further, the adjusting ranges are narrow, with the result that the overall air flow within the room cannot be controlled.

Further, in order to maintain the temperature distribution of the whole room, the positions of the vertical and lateral blow direction vanes 23 and 25 are made to shift at certain time intervals, so as to form a wide blow. In this method, however, the blow direction has to be repetitively adjusted, and therefore, there remain regions which the discharged air cannot reach. Therefore, a pleasant temperature distribution cannot be obtained.

SUMMARY OF THE INVENTION

The present invention is intended to overcome the above described disadvantages of the conventional technique.

Therefore it is an object of the present invention to provide an apparatus and a method for controlling the discharged air flow in an air conditioner, in which the blow direction vanes are moved in multiple angles to draw spinning curves so as to adjust the blow direction from the inside to the outside and from the outside to the inside, and the air flow rate is proportionally increased or decreased in accordance with the blow direction so as to form a helical flow, so that the indoor temperature can be maintained at a constant level.

In achieving the above object of the present invention, the apparatus for controlling a discharge air flow in an air conditioner according to the present invention includes: a suction hole for sucking an indoor air; a heat exchanger for heat-exchanging the indoor air after a suction of the indoor air through said suction hole; a discharge hole for discharging the heat-exchanged air; a plurality of blow direction vanes for adjusting a blow direction of a discharged air discharged through the discharge hole; and an indoor fan for adjusting a flow rate of the discharged air. The apparatus further includes: an operation manipulating means for inputting key signals to make the discharged air form a helical blow; a control means for controlling the flow direction of the blow direction vanes and the flow rate of the indoor fan to make the discharged air form a helical blow in accordance with the key signals; a blow direction adjusting means for adjusting the blow direction of the discharged air by shifting the blow direction angle of the blow direction vanes under the control of the control means; and a flow rate adjusting means for adjusting the flow rate of the discharged air by varying the flow rate of the indoor fan under the control of the control means.

In another aspect, the method for controlling the discharged air flow in an air conditioner according to the present invention includes the steps of: judging as to whether a helical blow is selected through an operating manipulating means (operation judging step); controlling a blow direction of blow direction vanes and a flow rate of an indoor fan to make a discharged air form a helical blow upon judging that a helical blow has been selected at the operation judging step (control step); adjusting the blow direction by moving the blow direction vanes to the blow angle of the control step (blow direction adjusting step); adjusting the flow rate of the discharged air by varying the flow rate of the indoor fan in accordance with the blow direction of the blow direction vanes (flow rate adjusting step); and discharging the heat-exchanged air into the room in accordance with the blow direction and the flow rate of the blow direction adjusting step and the flow rate of the flow rate adjusting step (air conditioning operating step).

BRIEF DESCRIPTION OF THE DRAWINGS

The above object and other advantages of the present invention will become more apparent by describing in detail the preferred embodiment of the present invention with reference to the attached drawings in which:

FIG. 4 is a block diagram showing the constitution of the air conditioner according to the present invention;

FIG. 5 is a flow chart showing the air discharge control operation in the air conditioner according to the present invention;

FIGS. 6A and 6B are flow charts showing the operation of forming a helical blow in the air conditioner according to the present invention;

FIG. 7 is a table showing the blow direction and the flow rate after forming the helical blow in the present invention;

DETAILED DESCRIPTION OF THE PREFERRED EMBODIMENT

Figure 1:
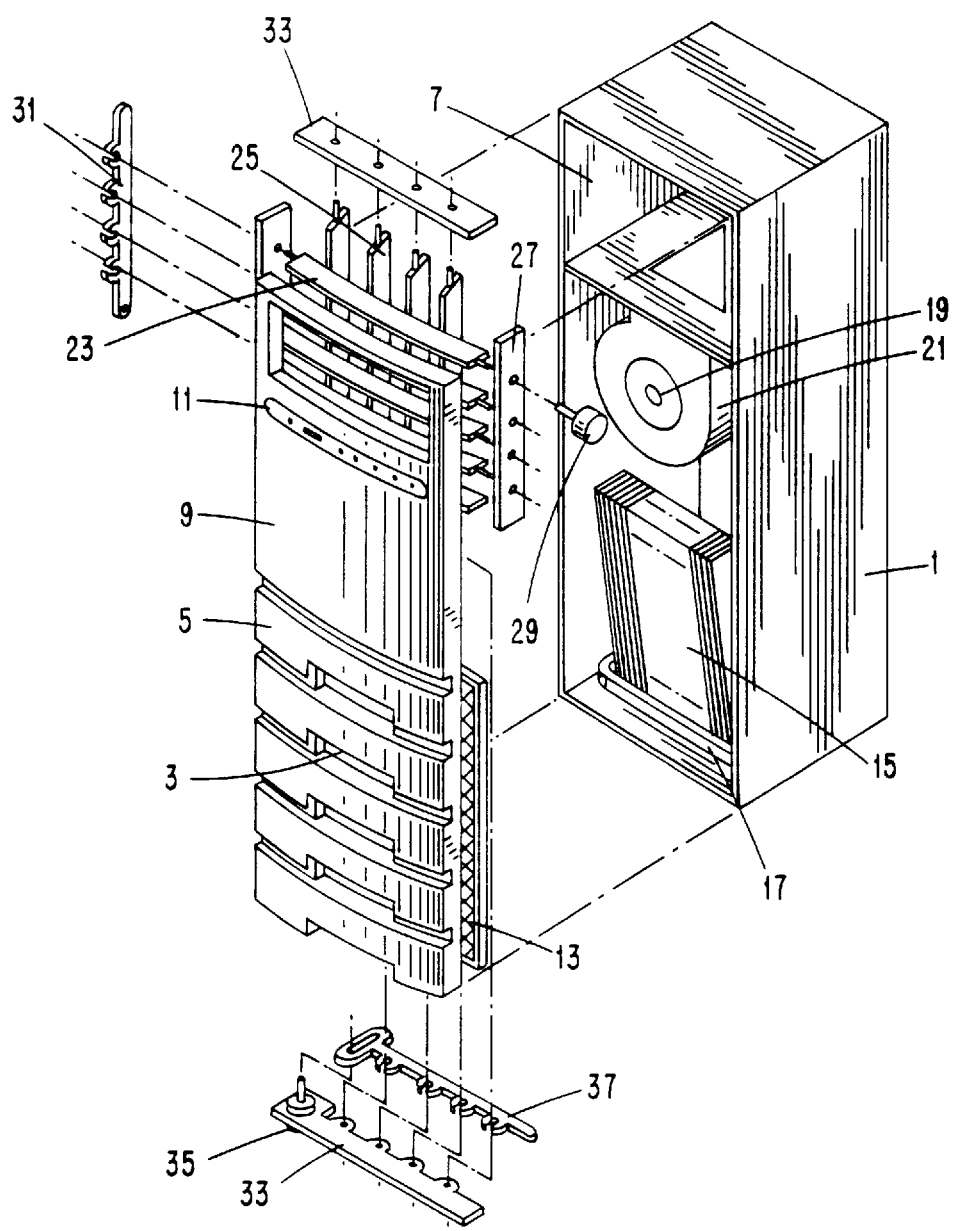
FIG. 1 is an exploded perspective view showing the indoor unit of a conventional air conditioner.
Figure 2:
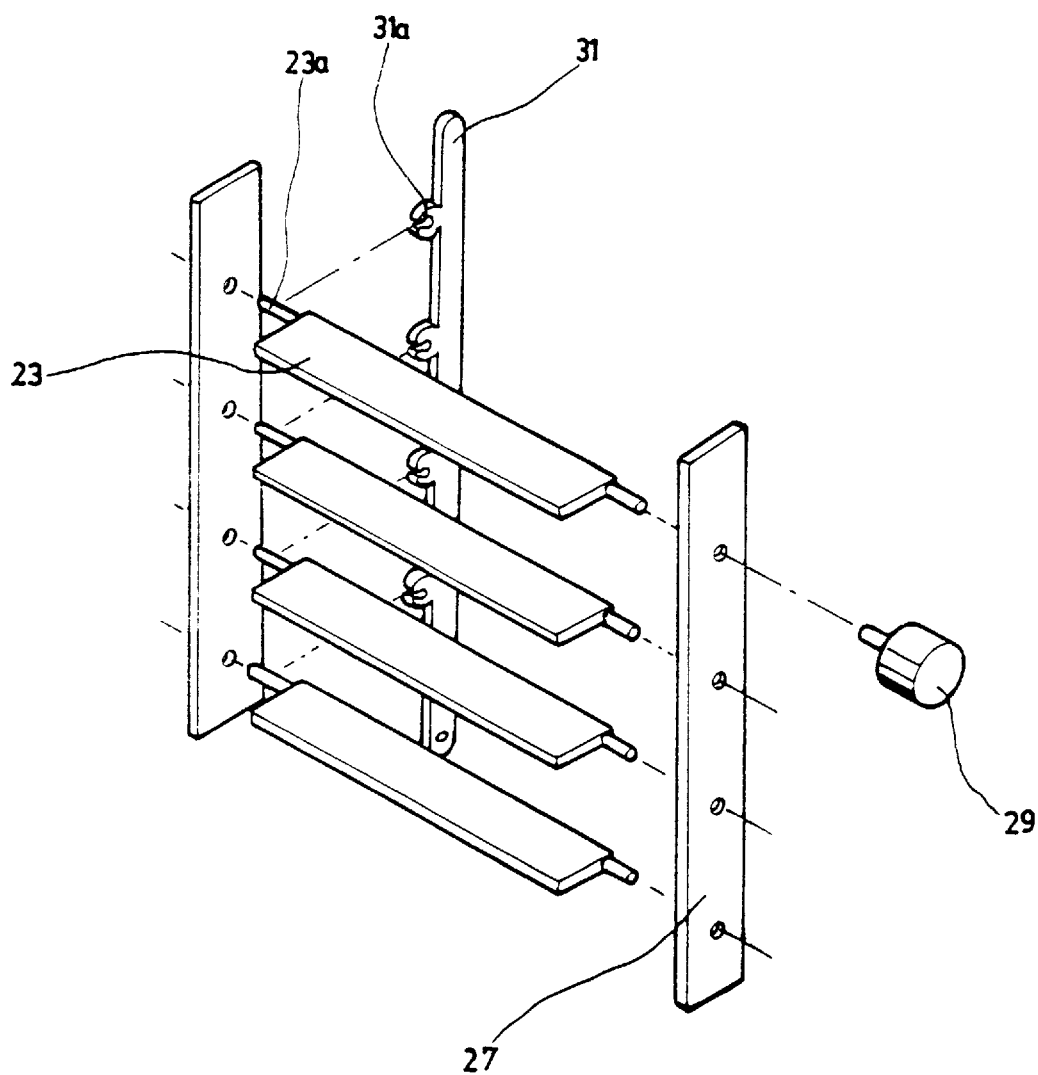
FIG. 2 is an exploded perspective view showing the vertical blow direction vanes of the conventional air conditioner.
Figure 3:
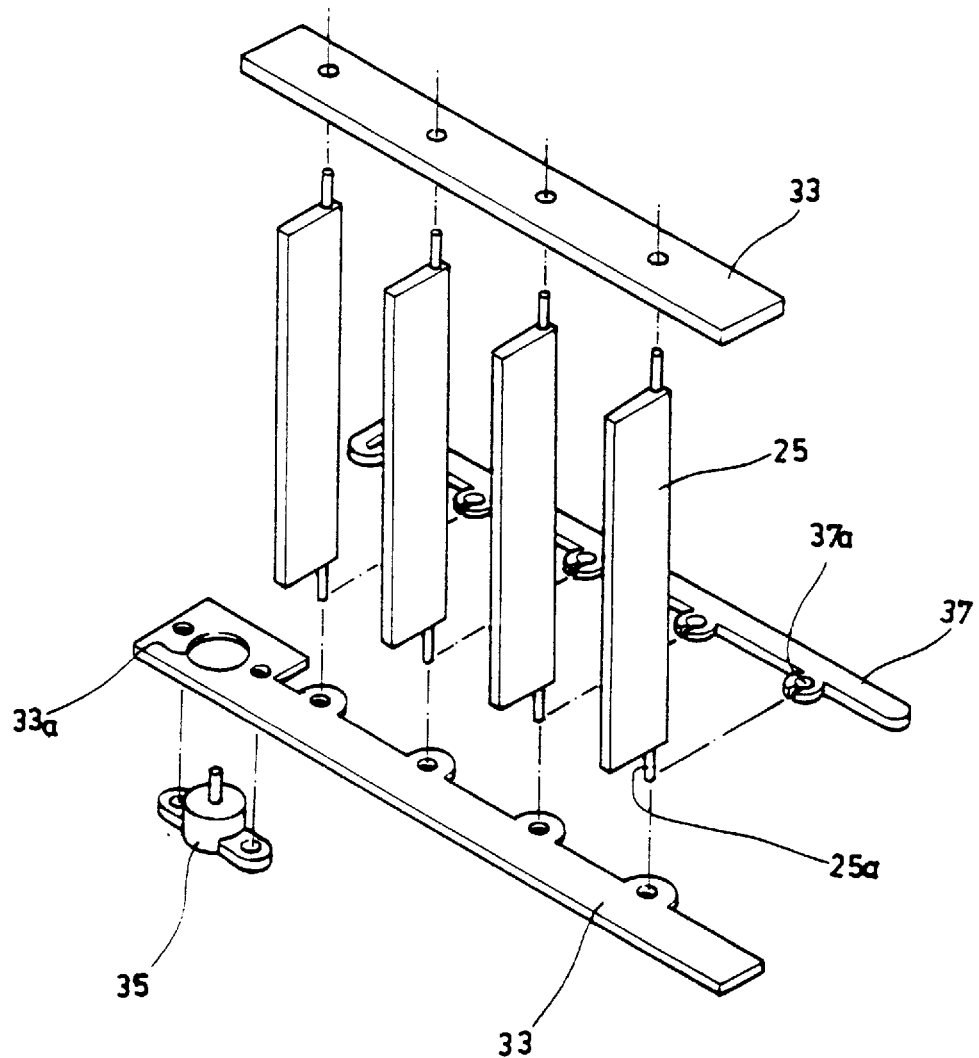
FIG. 3 is an exploded perspective view showing the lateral blow direction vanes of the conventional air conditioner.

The mechanical constitution of the air conditioner according to the present invention is same as that of the conventional air conditioner of FIGS. 1 to 3, and therefore, the same components and parts will be assigned with the same names and reference codes. Accordingly, the overlapping descriptions will be skipped.

As shown in FIG. 4, a power means 100 receives a commercial ac voltage from an ac power source, and converts it to a dc voltage which is suitable to the air conditioner. An operation manipulating means 102 has a plurality of function keys which are capable of controlling the operating modes (automatic, cooling, dehumidifying, blowing, heating and the like), start and stop of the operation, the blow direction and the blow rate of the discharged air, and a set temperature Ts. The operation manipulating means 102 adjusts the blow direction of the discharged air to the form of a spinning curve from the inside to the outside and from the outside to the inside. The operation manipulating means 102 has a helical blow key which is capable of increasing or decreasing the flow rate of the discharged air proportionally to form a helical blow.

A control means 104 receives the dc voltage from the power means 100 to initialize the air conditioner. This control means 104 consists of a microcomputer which controls the overall operation of the air conditioner in accordance with operation selection signals, and operation start/stop signals of the operation manipulating means 102. In accordance with the turning-on of the helical blow key, the control means 104 recognizes current moving angles of blow direction vanes 23 and 25, and moves the blow direction vanes 23 and 25 from the inside to the outside and from the outside to the inside so as to adjust the blow direction of the discharged air as if drawing a spinning curve. At the same time, the control means 104 increases or decreases the flow rate of the discharged air proportionally to the blow direction, so that the discharged air would form a helical blow. The blow direction and the flow rate which has been adjusted in accordance with the blow direction of the blow direction vanes 23 and 25 are stored in a ROM table as shown in FIG. 7.

An indoor temperature sensing means 106 senses an indoor temperature Tr of the air which is sucked through a suction hole 3, and thus controls the indoor temperature to a temperature Ts which has been set by the user through the operation manipulating means 102, so that an air conditioning operation can be carried out. A compressor driving means 108 drives a compressor 109 under the control of the control means 104 in accordance with the user's set temperature Ts and the sensed temperature Tr of the indoor temperature sensing means 106.

A blow direction adjusting means 110 adjusts the blow direction of the discharged air of the discharge hole 7 upon turning on the helical blow key, thereby forming a helical blow. The blow direction adjusting means 110 includes: a vertical blow direction adjusting section 112 for driving the vertical blow direction motor 29 to make the vertical blow direction vanes 23 move in accordance with the moving sequence provided by the control means 104; and a lateral blow direction adjusting section 114 for driving the lateral blow direction motor 35 to make the lateral blow direction vanes 25 move in accordance with the moving sequence provided by the control means 104.

A fan motor driving means 116 receives control signals from the control means 104 to increase or decrease the flow rate of the discharge hole 7 in accordance with the turning-on of the helical blow key, thereby forming a helical blow. Thus by receiving the control signals, the fan motor driving means 116 controls the revolution speed of an indoor fan motor 117 to drive an indoor fan 19. A display means 118 receives control signals from the control means 104 in accordance with key signals of the operation manipulating means 102, thereby displaying operation select modes (automatic, cooling, de-humidifying, blowing, heating and the like), the operation status, a set temperature Ts, and the indoor temperature Tr.

The apparatus of the present invention constituted as above will now be described as to its operation and effects.

FIG. 5 is a flow chart showing the air discharge control operation in the air conditioner according to the present invention. In FIG. 5, S stands for step.

First, if power is supplied to the air conditioner, the power means 100 receives a commercial ac voltage from an ac power source, and converts it to a dc voltage which is suitable to the air conditioner. This converted dc power is supplied to the respective driving circuits and to the control means 104.

Thus, at a step S1, the control means 104 receives the dc voltage from the power means 100 to initialize the air conditioner.

Then the user manipulates the operation manipulating means 102 to input the operation modes (automatic, cooling, de-humidifying, blowing, heating and the like) and a set temperature Ts. Then if the operation key is pressed, then an operation selecting signal and an operation starting signal (to be called operating signal below) are supplied from the operation manipulating means 102 to the control means 104.

Then at a step S2, the control means 104 judges as to whether the operation key is turned on. If the operation key is not turned on (that is, if "NO"), the air conditioner is maintained at a standby status until the operation key is turned on, and the steps after the step S2 are repeated.

On the other hand, at the step S2, if the operation key is turned on (that is, if "YES"), the system advances to a step S3. At the step S3, the control means 104 makes a judgment as to whether the helical blow key of the operation manipulating means 102 is turned on. If the helical blow key is turned on (that is, if "YES"), then the blow direction and the flow rate are simultaneously adjusted. Then in order to form a helical blow, the system advances to a step S4. Thus the control means 104 moves the vertical blow direction vanes 23 and the lateral blow direction vanes 25 to the original points (vertical and lateral). Then as if drawing a spinning curve, the moving angles of the vertical blow direction vanes 23 and the lateral blow direction vanes 25 are moved, and the flow rate of is increased or decreased in accordance with the blow direction, thereby forming a helical blow. This will be described in more detail referring to FIGS. 6A and 6B.

Figure 6B:
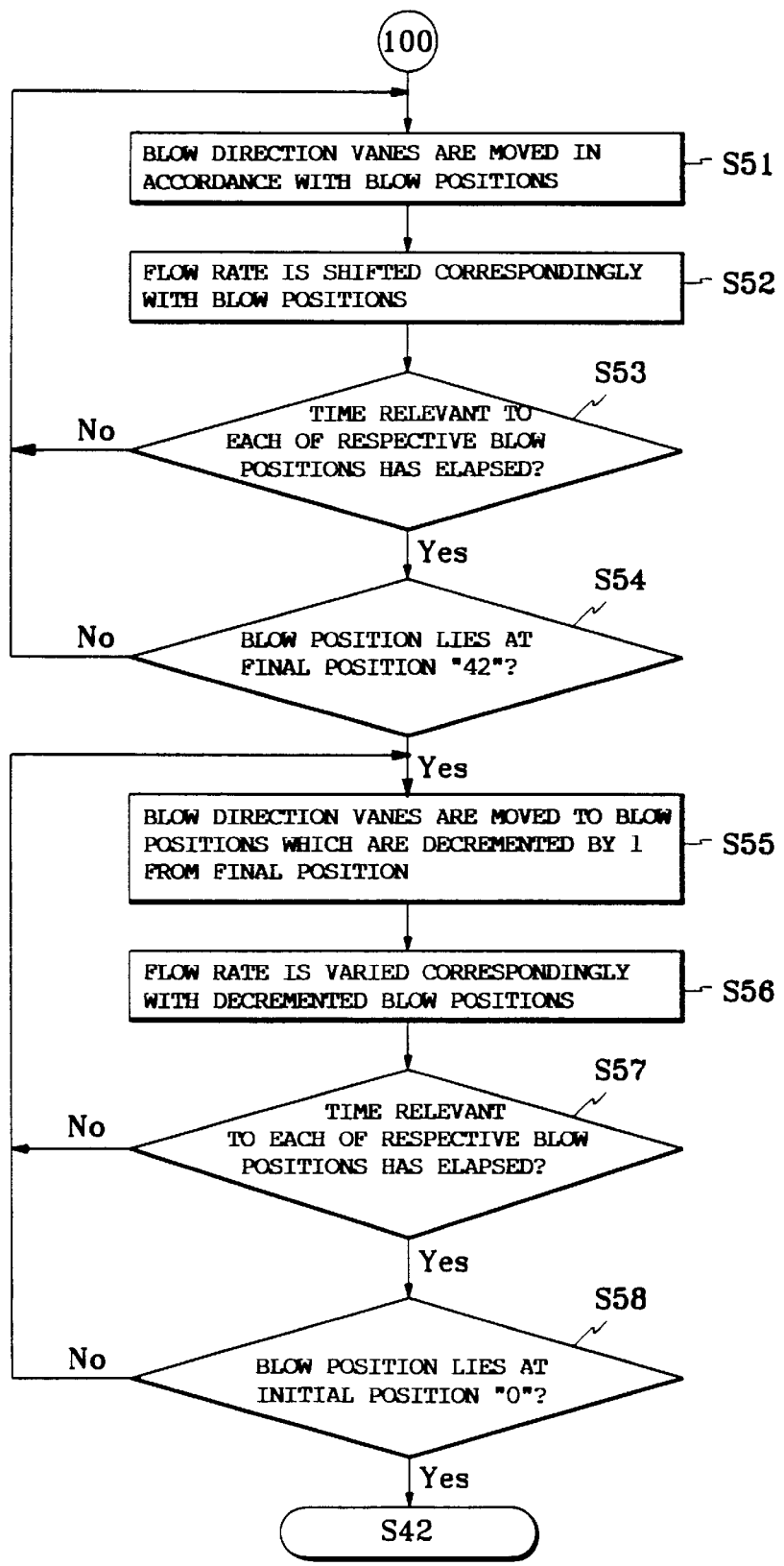

FIGS. 6A and 6B are flow charts showing the operation of forming a helical blow in the air conditioner according to the present invention.

First, at a step S41, the control means 104 outputs control signals for driving the vertical blow direction adjusting section 112 and the lateral blow direction adjusting section 114 to drive the vertical blow direction motor 29 and the lateral blow direction motor 35, so that the current blow directions of the vertical blow direction vanes 23 and the lateral blow direction vanes 25 can be perceived.

The vertical blow direction adjusting section 112 receives control signals from the control section 104 to drive the vertical blow direction motor 29, so that the vertical blow direction vanes 23 would be moved to the lowest level. The lateral blow direction adjusting section 114 receives control signals from the control section 104 to drive the lateral blow direction motor 35, so that the lateral blow direction vanes 25 would be moved to the leftmost or rightmost position.

Then at a step S42, the control means 104 sets the current blowing angles of the vertical blow direction vanes 23 and the lateral blow direction vanes 25 to "0" or to a reference point. Then the control means 104 outputs position control signals ("0" point in FIG. 7) to the vertical blow direction adjusting section 112 and to the lateral blow direction adjusting section 114 to move the vertical blow direction vanes 23 and the lateral blow direction vanes 25 as if they draw a spinning curve from the inside to the outside.

Figure 8:
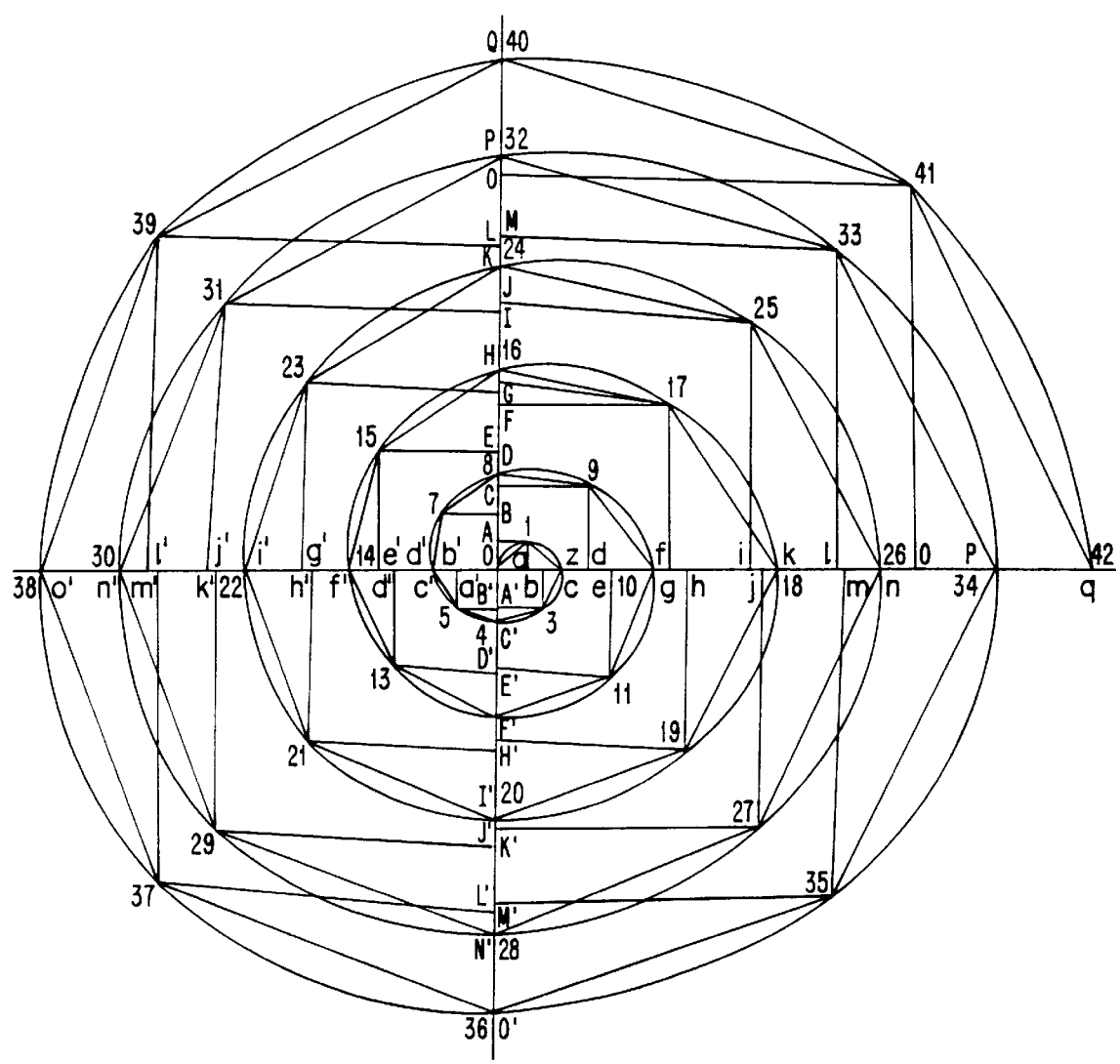
FIG. 8 illustrates the moving of the positions of the blow direction vanes during the formation of the helical blow according to the present invention.

Upon receipt of the control signals from the control means 104, the vertical blow direction adjusting section 112 and the lateral blow direction adjusting section 114 drive the vertical blow direction motor 29 and the lateral blow direction motor 35. Thus as shown in FIG. 8, the vertical blow direction vanes 23 and the lateral blow direction vanes 25 are moved to the central point (0 point) of the angular ranges.

Then at a step S43, the control means 104 decides as to whether the rotating directions of the vertical blow direction vanes 23 and the lateral blow direction vanes 25 are to be clockwise or anti-clockwise. Then the control means 104 outputs a flow rate control signal to the fan motor driving means 116, so that the flow rate (when the blow direction vanes 23 and 25 are positioned at the center of the adjustable angular range) would be adjusted to the data stored in the ROM table.

Accordingly, the fan motor driving means 116 receives a flow rate control signal from the control means 104 to drive the indoor fan motor 117 to a first stage flow rate in accordance with the blow direction (0 point) as shown in FIG. 7.

Then at a step S44, the time of adjusting the blow direction and the flow rate in accordance with the blow direction (0 point) is counted, and a judgment is made as to whether (a) seconds (the time required at the 0 point) stored in advance in the control means has been elapsed.

At the step S44, if it is found that (a) seconds did not elapse (if "NO"), then the system returns to the step S42 to adjust the blow direction and the flow rate corresponding to the blow position "0", and to repeat the operations from the step S42.

On the other hand, if (a) seconds have elapsed (if "YES"), the system advances to a step S45. At the step S45, the control means 104 outputs position control signals ("1" point in FIG. 7) to the vertical blow direction adjusting section 112 and to the lateral blow direction adjusting section 114, so that the vertical blow direction vanes 23 and the lateral blow direction vanes 25 can be moved from the inside to the outside.

Accordingly, the vertical blow direction adjusting section 112 receives the control signals from the control section 104 to drive the vertical blow direction motor 29. Thus as shown in FIG. 8, the vertical blow direction vanes 23 are moved to an A angle. The lateral blow direction adjusting section 114 receives the control signals from the control section 104 to drive the lateral blow direction motor 35. Thus as shown in FIG. 8, the lateral blow direction vanes 25 are moved to an a angle.

Then at a step S46, the control means 104 outputs flow rate control signals to the fan motor driving means 116, so that the flow rate with the blow direction vanes 23 and 25 positioned at the blow position "1" can be adjusted to the stored data of the ROM table.

Accordingly, the fan motor driving means 116 receives the flow rate control signals from the control means 104 to increase the revolution speed of the indoor fan motor 117 to a second stage corresponding to a blow position ("1" point). Then at a step S47, a judgment is made as to whether the time of adjusting the blow direction angles of the blow direction vanes 23 and 25 corresponding to a blow position ("1" point) and the time of adjusting the flow rate of the indoor fan motor 117 exceed (b) seconds (the time required at the blow position "1") which has been set within the control means 104.

At the step S47, if it is found that the (b) seconds have not elapsed (if "NO"), the system returns to the step S45 to adjust the blow direction and the flow rate corresponding to the blow position "1", and to repeat the operations of the step S45 and onward. On the other hand, if the (b) seconds have elapsed (if "YES"), the system advances to a step S48. At the step S48, the control means 104 outputs position control signals ("2" point in FIG. 7) to the vertical blow direction adjusting section 112 and to the lateral blow direction adjusting section 114, so that the vertical blow direction vanes 23 and the lateral blow direction vanes 25 would be moved from the inside to the outside.

Accordingly, the vertical blow direction adjusting section 112 receives the control signals from the control section 104 to drive the vertical blow direction motor 29. Thus as shown in FIG. 8, the vertical blow direction vanes 23 are moved to a 0 angle. The lateral blow direction adjusting section 114 receives the control signals from the control section 104 to drive the lateral blow direction motor 35. Thus as shown in FIG. 8, the lateral blow direction vanes 25 are moved to a c angle.

Then at a step S49, the control means 104 outputs flow rate control signals to the fan motor driving means 116, so that the flow rate with the blow direction vanes 23 and 25 positioned at a blow position "2" can be adjusted to the stored data of the ROM table.

Accordingly, the fan motor driving means 116 receives the flow rate control signals from the control means 104 to increase the revolution speed of the indoor fan motor 117 to a third stage corresponding to a blow position ("2" point) as shown in FIG. 7. Then at a step S50, a judgment is made as to whether the time of adjusting the blow direction angle of the blow direction vanes 23 and 25 corresponding to a blow position ("2" point) and the time of adjusting the flow rate of the indoor fan motor 117 exceed (c) seconds (the time required at the blow position "2") which has been set within the control means 104.

At the step S50, if it is found that the (c) seconds have not elapsed (if "NO"), the system returns to the step S48 to adjust the blow direction and the flow rate corresponding to the blow position "2", and to repeat the operations of the step S48 and onward. On the other hand, if the (c) seconds have elapsed (if "YES"), the system advances to a step S51. At the step S51, the control means 104 outputs position control signals ("3", "4", "5", . . . "42" points in FIG. 7) to the vertical blow direction adjusting section 112 and to the lateral blow direction adjusting section 114, so that the vertical blow direction vanes 23 and the lateral blow direction vanes 25 would be moved from the inside to the outside.

Accordingly, the vertical blow direction adjusting section 112 receives the control signals from the control section 104 to drive the vertical blow direction motor 29. Thus as shown in FIG. 8, the vertical blow direction vanes 23 are sequentially moved to relevant angles A', C', B', . . . 0 corresponding to blow positions ("3", "4", "5", . . . "42" points). The lateral blow direction adjusting section 114 receives the control signals from the control section 104 to drive the lateral blow direction motor 35. Thus as shown in FIG. 8, the lateral blow direction vanes 25 are sequentially moved to relevant angles b, 0, a', . . . q corresponding to blow positions ("3", "4", "5", . . . "42" points).

Then at a step S52, the control means 104 outputs flow rate control signals to the fan motor driving means 116, so that the flow rate with the blow direction vanes 23 and 25 positioned at blow positions ("3", "4", "5", . . . "42" points) can be adjusted to the stored data of the ROM table.

Accordingly, the fan motor driving means 116 receives the flow rate control signals from the control means 104 to increase the revolution speed of the indoor fan motor 117 to 4th, 5th, 6th, . . . 43rd stages corresponding to blow positions ("3", "4", "5", . . . "42" points) as shown in FIG. 8. Then at a step S53, a judgment is made as to whether the time of adjusting the blow direction angles of the blow direction vanes 23 and 25 corresponding to blow positions ("3", "4", "5", . . . "42" points) and the time of adjusting the flow rate of the indoor fan motor 117 exceed the pre-set time (the time required at the blow positions "3", "4", "5", . . . "42") which have been set within the control means 104.

Figure 9:
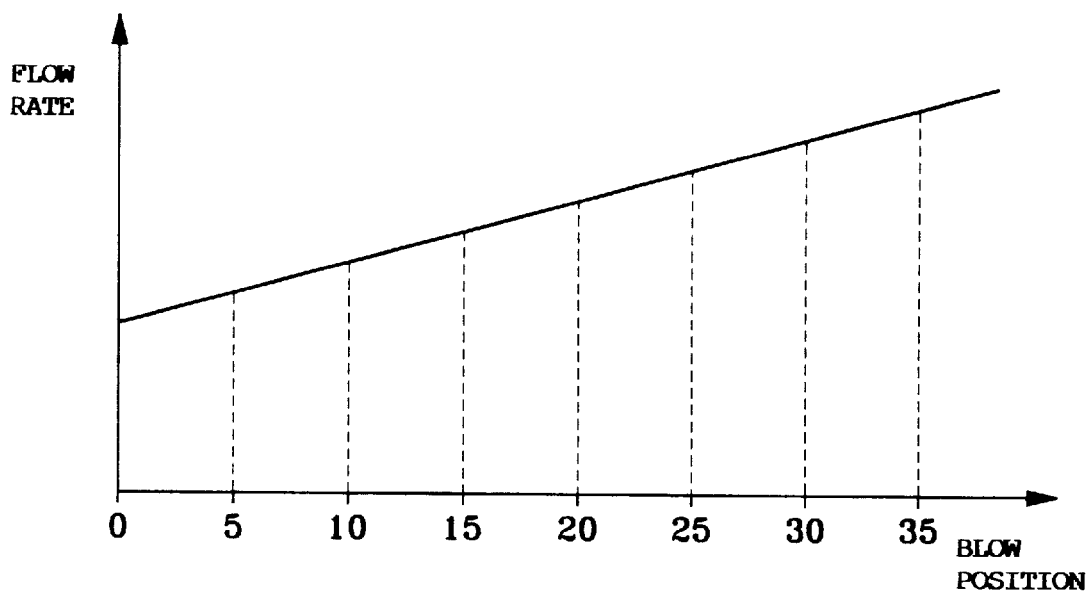
FIG. 9 illustrates the adjustments of the flow rate at different positions of the blow direction vanes according to the present invention.
Figure 10:
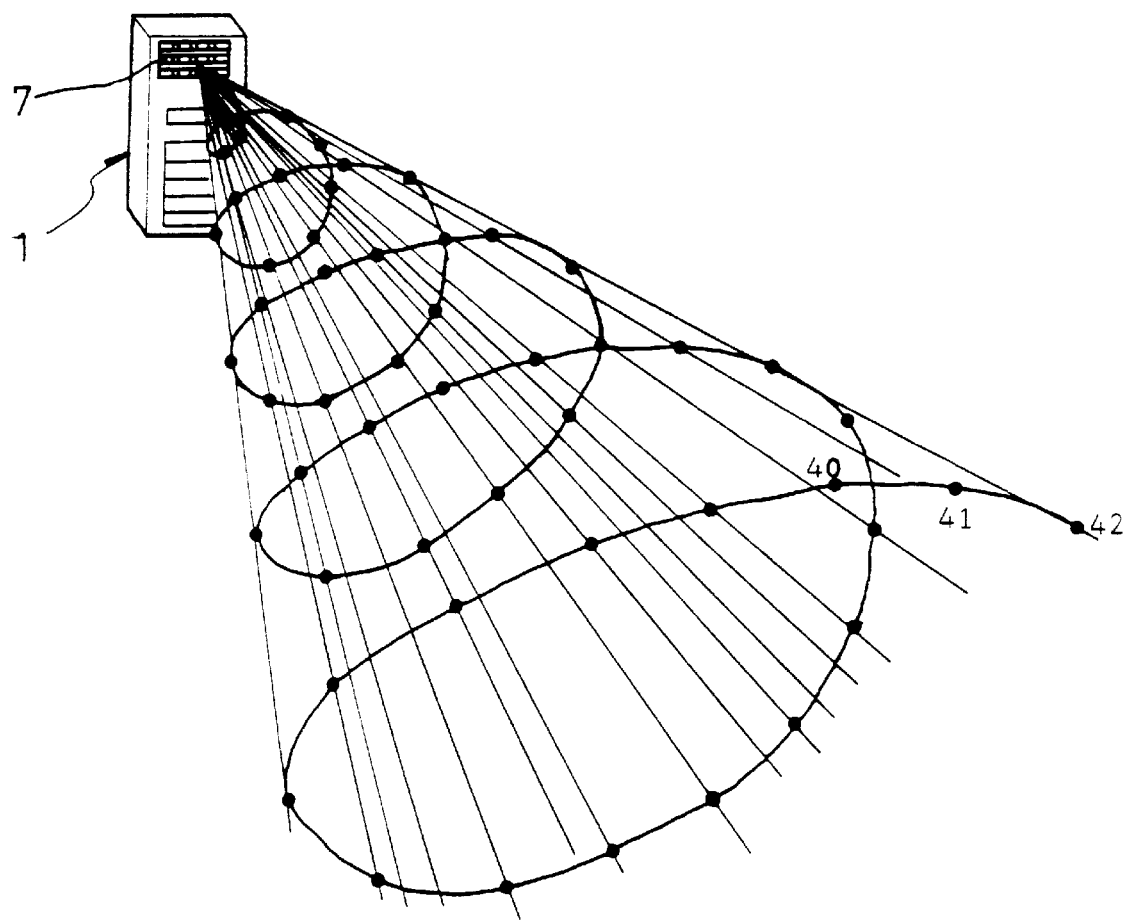
FIG. 10 illustrates the formation of the helical blow in the air conditioner according to the present invention.

At the step S53, if it is found that the relevant time has not elapsed (if "NO"), the system returns to the step S51 to adjust the blow direction and the flow rate corresponding to the blow positions "3", "4", "5", . . . "42", and to repeat the operations of the step S51 and onward. Thus as shown in FIG. 8, the blow angles of the vertical blow direction vanes 23 and the lateral blow direction vanes 25 are moved as if they draw a spinning curve from the inside to the outside. Further, as shown in FIG. 9, the flow rates of the indoor fan motor 117 corresponding to the respective blow direction angles are proportionally increased as shown in FIG. 10, thereby forming a helical blow.

On the other hand, if the relevant time has elapsed (if "YES"), the system advances to a step S54. At the step S54, a judgment is made as to whether the blow position has shifted up to the final position "42". If it has not been shifted up to the final position (if "NO"), the system returns to the step S51 to repeat the operations of the step S51 and onward. If it has been shifted up to the final position, the system advances to a step S55. At the step S55, the control means 104 outputs position control signals ("42", "41", "40" , . . ."0" points in FIG. 7) to the vertical blow direction adjusting section 112 and to the lateral blow direction adjusting section 114, so that the vertical blow direction vanes 23 and the lateral blow direction vanes 25 would be moved from the inside to the outside.

Accordingly, the vertical blow direction adjusting section 112 receives the control signals from the control section 104 to drive the vertical blow direction motor 29. Thus as shown in FIG. 8, the vertical blow direction vanes 23 are sequentially moved to relevant angles 0, 0, 0, . . . 0 corresponding to blow positions ("42", "41 ", "40", . . . "0" points). The lateral blow direction adjusting section 114 receives the control signals from the control section 104 to drive the lateral blow direction motor 35. Thus as shown in FIG. 8, the lateral blow direction vanes 25 are sequentially moved to relevant angles (q, o, 0, . . . 0) corresponding to blow positions ("42", "41", "40", . . . "0" points).

Then at a step S56, the control means 104 outputs flow rate control signals to the fan motor driving means 116, so that the flow rate with the blow direction vanes 23 and 25 positioned at blow positions ("42", "41 ", "40" , . . . "0" points) can be adjusted to the stored data of the ROM table.

Accordingly, the fan motor driving means 116 receives the flow rate control signals from the control means 104 to decrease the revolution speed of the indoor fan motor 117 to 43rd, 42nd, 40th , . . . 1st stages corresponding to blow positions ("42", "41", "40", . . . "0" points) as shown in FIG. 7. Then at a step S57, a judgment is made as to whether the time of adjusting the blow direction angle of the blow direction vanes 23 and 25 corresponding to blow positions ("42", "41 ", "40" , . . . "0" points) and the time of adjusting the flow rate of the indoor fan motor 117 exceed the pre-set time (the time required at the blow positions "42", "41", "40", . . . "0") which have been set within the control means 104.

At the step S57, if it is found that the pre-set time has not elapsed (if "NO"), the system returns to the step S55 to adjust the blow direction and the flow rate corresponding to the blow positions "42", "41", "40", . . . "0", and to repeat the operations of the step S55 and onward. Thus as shown in FIG. 8, the blow angles of the vertical blow direction vanes 23 and the lateral blow direction vanes 25 are moved as if they draw a spinning curve from the inside to the outside. Further, as shown in FIG. 9, the flow rates of the indoor fan motor 117 corresponding to the respective blow direction angles are proportionally decreased as shown in FIG. 10, thereby forming a helical blow.

On the other hand, at the step S57, if the relevant time has elapsed (if "YES"), the system advances to a step S58. At the step S58, a judgment is made as to whether the blow position has shifted up to the initial position "0". If it has not been shifted up to the initial position (if "NO"), the system returns to the step S55 to repeat the operations of the step S55 and onward. If it has been shifted up to the initial position (if "YES"), the system advances to a step S42. At the step S42, the operations of the step S42 and onward are repeated, thereby maintaining the indoor temperature at a constant level.

As described above, the blow direction vanes 23 and 25 are adjusted as to the blow angle and the flow rate to form a helical blow, thereby carrying out the cooling or warming of the room. For this purpose, as shown in the step S5 of FIG. 5, the indoor air which is sucked through the suction hole 3 into the main body 1 is sensed by the indoor temperature sensing means 106 as to the temperature Tr to output the sensed result to the control means 104. Then the indoor temperature Tr of the indoor temperature sensing means 106 and the user's set temperature Ts are compared with each other, so that a judgment can be made as to whether it meets the driving condition for the compressor 109.

The driving condition of the compressor is meant as follows. That is, during a room cooling operation, the sensed indoor temperature Tr of the indoor temperature sensing means 106 is higher than the set temperature Ts. Meanwhile, during a room warming operation, the sensed temperature Tr is lower than the set temperature Ts. In the present invention, the descriptions on this will be made by taking examples of a room cooling operation and a room warming operation.

At the step S5, if it is found that the driving condition for the compressor 109 is not met (if "NO"), the system returns to the step S4 to form a helical blow and to repeat the operations of the step S4 and onward. If the driving condition for the compressor 109 is met (if "YES"), the system advances to a step S6. At the step S6, the control means 104 decides the operating frequency for the compressor 109, and then outputs a control signal to the compressor driving means 108 to drive the compressor 109.

Accordingly, the compressor driving means 108 drives the compressor 109 based on the operating frequency which has been decided by the control means 104.

If the compressor 109 is driven, then at a step S7, the indoor fan 19 is driven, and the indoor air is sucked through the suction hole 3 into the main body 1. Foreign materials such as dust which are floating in the sucked air are removed during passing through the filtering member 13. The sucked indoor air which has been deprived of the foreign materials passes through the heat exchanger 15 to be heat-exchanged by the refrigerant which flows through the heat exchanger 15.

The air which has been heat-exchanged is guided by the duct member 21 to be moved upward so as to be discharged through the discharge hole 7 into the room. Owing to the moving of the vertical and lateral blow direction vanes 23 and 25 and the consequent adjustment of the flow rate of the cool air, the discharged air is spread uniformly within the room. Thus the air conditioning is carried out while keeping a pleasant atmosphere.

During the normal operation of the air conditioner as described above, at a step S8, the control means 104 judges as to whether the operating key is turned off. If the operating key is not turned off (if "NO"), the system returns to the step S7 to continue the normal operation.

At the step S8, if it is found that the operating key has been turned off (if "YES"), the system advances to a step S9. At the step S9, the control means 104 outputs control signals to the compressor driving means 108 and to the fan motor driving means 116, so that the compressor 109 and the indoor fan motor 117 would be stopped.

Accordingly, the compressor driving means 108 stops the compressor 109 under the control of the control means 104. The fan motor driving means 116 stops the indoor fan motor 117 under the control of the control means 104 so as to stop the indoor fan 19.

Then at a step S10, under the control of the control means 104, the vertical and lateral blow direction adjusting sections 112 and 114 turn off the vertical and lateral blow direction motors 29 and 35 to stop the vertical and lateral blow direction vanes 23 and 25. At a step S11, the control means 104 puts the air conditioner to a standby position until the operating key is turned on again, while repeating the operations of the step S2 and onward.

Meanwhile, at the step S3, if the helical blow key is not turned on (if "NO"), the system advances to a step S12. At the step S12, the control means 104 outputs control signals to the vertical and lateral blow direction adjusting sections 112 and 114 to drive the vertical and lateral blow direction motors 29 and 35, so that the blow angles of the vertical and lateral blow direction vanes 23 and 25 can be adjusted.

Accordingly, the vertical and lateral blow direction adjusting sections 112 and 114 receive the control signals from the control section 104 to drive the vertical and lateral blow direction motors 29 and 35. Thus the blow angles of the vertical and lateral blow direction vanes 23 and 25 can be adjusted in accordance with the setting of the user. At a step S13, the control means 104 outputs a control signal to the fan motor driving means 116 to drive the indoor fan motor 117.

Accordingly, the fan motor driving means 116 receives the control signal from the control means 104 in accordance with the flow rate which has been inputted through the operation manipulating means 102. Thus the revolution speed of the indoor fan motor 117 is controlled to drive the indoor fan 19. Then the system returns to the step S5 to repeat the operations of the step S5 and onward.

According to the present invention as described above, the angles of the blow direction vanes 23 and 25 are adjusted in different angles, so that the blow direction can be adjusted as if drawing a spinning curve from the inside to the outside and from the outside to the inside. In accordance with these blow angles, the flow rate is increased or decreased proportionally, so that a helical blow can be formed, thereby maintaining the indoor temperature at a constant level.

What is claimed is:

1. An apparatus for controlling a discharge air flow in an air conditioner, comprising: a suction hole for sucking an indoor air; a heat exchanger for heat-exchanging an indoor air after a suction of the indoor air through said suction hole to form a heat-exchanged air; a discharge hole for discharging the heat-exchanged air; a plurality of blow direction vanes for adjusting a blow direction of a discharged air discharged through said discharge hole; and an indoor fan for adjusting a flow rate of the discharged air, the apparatus further comprising:

an operation manipulating means for inputting key signals to make the discharged air form a helical blow;

a control means for controlling the blow direction of said blow direction vanes and the flow rate of said indoor fan to make the discharged air form a helical blow in accordance with the key signals;

a blow direction adjusting means for adjusting the blow direction of the discharged air by shifting a blow direction angle of said flow direction vanes under a control of said control means; and a flow rate adjusting means for adjusting the flow rate of the discharged air by varying the flow rate of said indoor fan under a control of said control means.

2. The apparatus as claimed in claim 1, wherein said operation manipulating means comprises a helical blow key for forming a helical blow by adjusting a blow direction and a flow rate of the discharged air discharged through said discharge hole.

3. The apparatus as claimed in claim 1, wherein said control means moves the blow direction angle of said blow direction vanes to many different angles, and varies the flow rate of said indoor fan to form a helical blow.

4. The apparatus as claimed in claim 1, wherein said blow direction adjusting means moves the blow directions of said blow direction vanes from an inside to an outside and from an outside to an inside to form a spinning curve with the discharged air.

5. The apparatus as claimed in claim 1, wherein said flow rate adjusting means increases or decreases the flow rate of said indoor fan proportionally in accordance with the blow direction angle of said blow direction vanes to make the discharged air uniformly spread within a room.

6. A method for controlling a discharged air flow in an air conditioner, comprising the steps of:

judging as to whether a helical blow is selected through an operating manipulating means;

controlling blow angles of blow direction vanes and a flow rate of an indoor fan to make a discharged air form a helical blow upon judging that a helical blow has been selected at the operation judging step;

adjusting a blow direction by moving said blow direction vanes to the blow angles of the control step;

adjusting a flow rate of the discharged air by varying the flow rate of said indoor fan in accordance with the blow direction of said blow direction vanes; and discharging the heat-exchanged air into a room in accordance with the blow direction and the flow rate of the blow direction adjusting step and the flow rate adjusting step.

* * * * *